(12) United States Patent
Caldwell et al.

(10) Patent No.: US 8,189,548 B2
(45) Date of Patent: May 29, 2012

(54) AUTHORIZING ACCESS TO TELECOMMUNICATIONS NETWORKS FOR MOBILE DEVICES, SUCH AS MOBILE DEVICES ACCESSING NETWORKS VIA NON-TRADITIONAL ENTRY POINTS

(75) Inventors: Christopher E. Caldwell, Woodstock, GA (US); Janne P. Linkola, Espoo (FI)

(73) Assignee: T-Mobile USA, Inc., Bellevue, WA (US)

( * ) Notice: Subject to any disclaimer, the term of this patent is extended or adjusted under 35 U.S.C. 154(b) by 551 days.

(21) Appl. No.: 12/399,710

(22) Filed: Mar. 6, 2009

(65) Prior Publication Data

US 2010/0226347 A1    Sep. 9, 2010

(51) Int. Cl.
*H04W 4/00* (2009.01)
*H04B 7/00* (2006.01)

(52) U.S. Cl. ........ 370/338; 370/328; 370/330; 370/340; 455/525

(58) Field of Classification Search .................. 370/328, 370/330, 338, 340; 455/422.1–460, 524, 455/525
See application file for complete search history.

(56) References Cited

U.S. PATENT DOCUMENTS

| | | | |
|---|---|---|---|
| 5,406,615 A | 4/1995 | Miller, II et al. | |
| 5,475,677 A | 12/1995 | Arnold et al. | |
| 6,647,426 B2 | 11/2003 | Mohammed | |
| 6,680,923 B1 | 1/2004 | Leon | |
| 6,922,559 B2 | 7/2005 | Mohammed | |
| 6,925,074 B1 | 8/2005 | Vikberg et al. | |
| 7,127,250 B2 | 10/2006 | Gallagher et al. | |
| 7,283,822 B2 | 10/2007 | Gallagher et al. | |
| 7,308,263 B2 | 12/2007 | Gallagher et al. | |
| 7,324,818 B2 | 1/2008 | Gallagher et al. | |
| 7,565,145 B2 | 7/2009 | Gallagher et al. | |
| 7,623,486 B2 | 11/2009 | Caldwell et al. | |
| 2002/0156897 A1 | 10/2002 | Chintalapati et al. | |
| 2002/0167933 A1 | 11/2002 | Feli et al. | |
| 2002/0197991 A1 | 12/2002 | Anvekar et al. | |
| 2003/0114158 A1 | 6/2003 | Soderbacka et al. | |
| 2003/0119490 A1 | 6/2003 | Mohammed | |
| 2003/0176186 A1 | 9/2003 | Mohammed | |
| 2004/0001461 A1 | 1/2004 | Lohtia et al. | |
| 2004/0072581 A1 | 4/2004 | Tajima et al. | |
| 2004/0090958 A1 | 5/2004 | Park et al. | |

(Continued)

FOREIGN PATENT DOCUMENTS

EP    1865656 A1    12/2007

(Continued)

OTHER PUBLICATIONS

International Search Report and Written Opinion for PCT/US2010/026272; Filed on Mar. 4, 2010, Applicant: T-Mobile USA, Inc., Mailed Oct. 19, 2010, 12 pages.

(Continued)

*Primary Examiner* — Ricky Ngo
*Assistant Examiner* — Paul H Masur

(57) ABSTRACT

A system and method for authorizing mobile devices to carrier networks via non-traditional entry points is described. In some examples, the system reviews a registration message sent during establishment of a communication session between the mobile device and the carrier's network to determine the type of access network used by the mobile device. In some cases, the system may identify the base station controller originating the registration message when determining whether the access request came from an IP-based network or other non-traditional entry point.

25 Claims, 5 Drawing Sheets

U.S. PATENT DOCUMENTS

| | | | |
|---|---|---|---|
| 2004/0142693 | A1 | 7/2004 | Feder et al. |
| 2005/0018637 | A1 | 1/2005 | Karoubalis et al. |
| 2005/0221828 | A1 | 10/2005 | Wakuta et al. |
| 2006/0020694 | A1 | 1/2006 | Nag et al. |
| 2006/0095954 | A1 | 5/2006 | Buckley et al. |
| 2006/0098598 | A1 | 5/2006 | Gallagher |
| 2006/0223498 | A1 | 10/2006 | Gallagher et al. |
| 2007/0026862 | A1 | 2/2007 | Hicks et al. |
| 2007/0083470 | A1 | 4/2007 | Bonner et al. |
| 2007/0173251 | A1* | 7/2007 | Vikberg et al. ............... 455/428 |
| 2007/0268908 | A1 | 11/2007 | Linkola et al. |
| 2008/0076420 | A1 | 3/2008 | Khetawat et al. |
| 2009/0061863 | A1* | 3/2009 | Huggett et al. ............... 455/434 |
| 2009/0092081 | A1* | 4/2009 | Balasubramanian et al. 370/328 |
| 2009/0219826 | A1 | 9/2009 | Linkola et al. |
| 2010/0093307 | A1* | 4/2010 | Hui et al. .................... 455/404.2 |
| 2010/0214977 | A1* | 8/2010 | Hegde ........................... 370/328 |
| 2010/0226346 | A1 | 9/2010 | Caldwell et al. |
| 2011/0076998 | A1* | 3/2011 | Proctor et al. ................ 455/423 |
| 2011/0093945 | A1* | 4/2011 | Vikberg et al. ................ 726/12 |

FOREIGN PATENT DOCUMENTS

| | | | |
|---|---|---|---|
| WO | WO-01/58190 | A1 | 8/2001 |
| WO | WO-2004102941 | A1 | 11/2004 |
| WO | WO-2006/047862 | A1 | 5/2006 |
| WO | WO-2006062907 | A1 | 6/2006 |
| WO | WO-2006135285 | A2 | 12/2006 |
| WO | WO-2007015075 | A1 | 2/2007 |
| WO | WO-2008036938 | A2 | 3/2008 |

OTHER PUBLICATIONS

"Dontronics, USB to RJ-11 VoIP Phone Adaptor," Apr. 19, 2006, http://www.dontronics.com/phoneconnector.html, 7 pages.

"IVT Corporation, Bluetooth PSTN Voice AP," Apr. 19, 2006, http://www.ivtcorporation.com/products/ap/index.php, 3 pages.

"Telco Systems: A BATM Company, Access200 Product Family Voice over IP Analog Telephone Adapters," Copyright 2005 Telco Systems, 2 pages.

"Vonage and Motorola Announce a Co-Branded Internet Telephone Adaptor with Wireless Router," PR Newswire (U.S.), Mar. 14, 2007, Copyright 2007, PR Newswire Association LLC, 2 pages.

Bertolucci, Jeff, "Vonage's flashy V-Portal offers easier VoIP setup," PC World, Apr. 1, 2008, Copyright 2008 PC World Communications, Inc., 1 page.

Greene, Tim, "Vonage tailors VoIP for small firms: Flat-fee dialing includes local, long-distance calls," Network World, Jun. 23, 2003, Copyright 2003 Network World, Inc., 2 pages.

Honan, Mathew, "I Am Here: One Man's Experience With the Location-Aware Lifestyle," Wired Magazine: 17.2, pp. 1-7, <http://www.wired.com/gadgets/wireless/magazine/17-02/lp_guineapig?currentPage=all> [date accessed Jan. 23, 2009].

International Search Report and Written Opinion for PCT/US2009/051072; Filed on Jul. 17, 2009, Applicant: T-Mobile USA, Inc., Mailed on Nov. 6, 2009, 12 pages.

International Search Report and Written Opinion, International Application No. PCT/US2006/049341, Filed on Dec. 27, 2006, Applicant: T-Mobile USA, Inc., Date of Mailing: Oct. 11, 2007, 9 pages.

International Search Report and Written Opinion, International Application No. PCT/US2007/072569, Filed on Jun. 29, 2007, Applicant: T-Mobile USA, Inc., Mailed on Jan. 2, 2008, 20 pages.

Lazarowitz, Elizabeth, "Easy Call: Phoning Via Web," New York Daily News, Feb. 5, 2007, Copyright 2007 Daily News, New York, 3 pages.

Leggio, Simone et al., "Achieving Seamless Mobility in IP-Based Radio Access Networks," IEEE Wireless Communications, Feb. 2005, pp. 54-59.

Rexhepi, Vlora et al., "Performance of Streaming Services in GERAN A/Gb Mode," Nokia Research Center, IEEE 2004, pp. 4511-4515.

Shaw, Keith, "VoIP invades the home network," Network World, Aug. 30, 2004, Copyright 2004 Network World, Inc., 1 page.

* cited by examiner

AUTHORIZING ACCESS TO TELECOMMUNICATIONS NETWORKS FOR MOBILE DEVICES, SUCH AS MOBILE DEVICES ACCESSING NETWORKS VIA NON-TRADITIONAL ENTRY POINTS

BACKGROUND

In this digital age, modern telecommunication service providers and device manufacturers are increasingly relying on public and/or private IP networks, including the Internet, as a core part of their technology. For example, many telecommunications service providers now offer a suite of Voice over IP ("VoIP") services, as well as various data services, that utilize IP networks and/or IP-based wireless access networks (e.g., access networks based on IEEE 802.16 ("WiMAX"), IEEE 802.20 Mobile Broadband Wireless Access (MBWA), Ultra Wideband (UWB), 802.11 wireless fidelity ("Wi-Fi"), Bluetooth, and similar standards) for at least part of their infrastructure. Likewise, device manufacturers are producing the next generation of mobile devices (e.g. wireless handhelds, wireless handsets, mobile phones, personal digital assistances, notebook computers, and similar devices) that are enabled to send and receive information utilizing IP-based telecommunications services. In fact, many of today's modern mobile devices are able to function as "dual-mode devices" that take advantage of both cellular network technologies and IP-based technologies.

Unlicensed Mobile Access (UMA) technology has developed as part of this trend to incorporate IP solutions into mobile device telecommunication systems. UMA technology has recently been accepted into Release 6 of the 3rd Generation Partnership Project (3GPP) and is also referred to as Generic Access Network (GAN) technology. In various implementation schemes, UMA allows wireless service providers to merge cellular networks, such as Global System for Mobile Communications (GSM) networks and IP-based wireless networks into one seamless service (with one mobile device, one user interface, and a common set of network services for both voice and data). One goal of UMA is to allow subscribers to move transparently between cellular networks and IP-based wireless networks with seamless voice and data session continuity, much like they can transparently move between cells within the cellular network. Seamless in-call handover between the IP-based wireless network and the cellular network ensures that the user's location and mobility do not affect the services delivered to the user.

At an operational level, UMA technology effectively creates a parallel radio access network, the UMA network, which interfaces to the mobile core network using standard mobility-enabled interfaces. For example, UMA can replace a system's GSM radio technology on the lower protocol layers with a Wireless LAN, or similar technology. A call or other communication may be tunneled to the Mobile Switching Center (MSC) of a mobile service provider via an access point (e.g., a Wi-Fi access point connected to a modem via the Internet) and gateway (e.g., a UMA network controller). In many cases, the mobile core network remains unchanged, making it much easier to maintain full service and operational transparency and allowing other aspects of the service infrastructure to remain in place. For example, in many systems that utilize UMA, the existing service provider's business support systems (BSS), service delivery systems, content services, regulatory compliance systems, and operation support systems (OSS) can support the UMA network without change. Likewise, service enhancements and technology evolution of the mobile core network apply transparently to both cellular access and UMA.

As the incorporation of IP solutions, such as UMA, into mobile device telecommunication systems expands, wireless service providers and wireless users may face various obstacles. For example, the transparent nature of IP solutions may prohibit implementing certain subscription based services to mobile devices that access a carrier or other network via non-traditional entry points, such as unlicensed networks.

DETAILED DESCRIPTION

Figure 1:
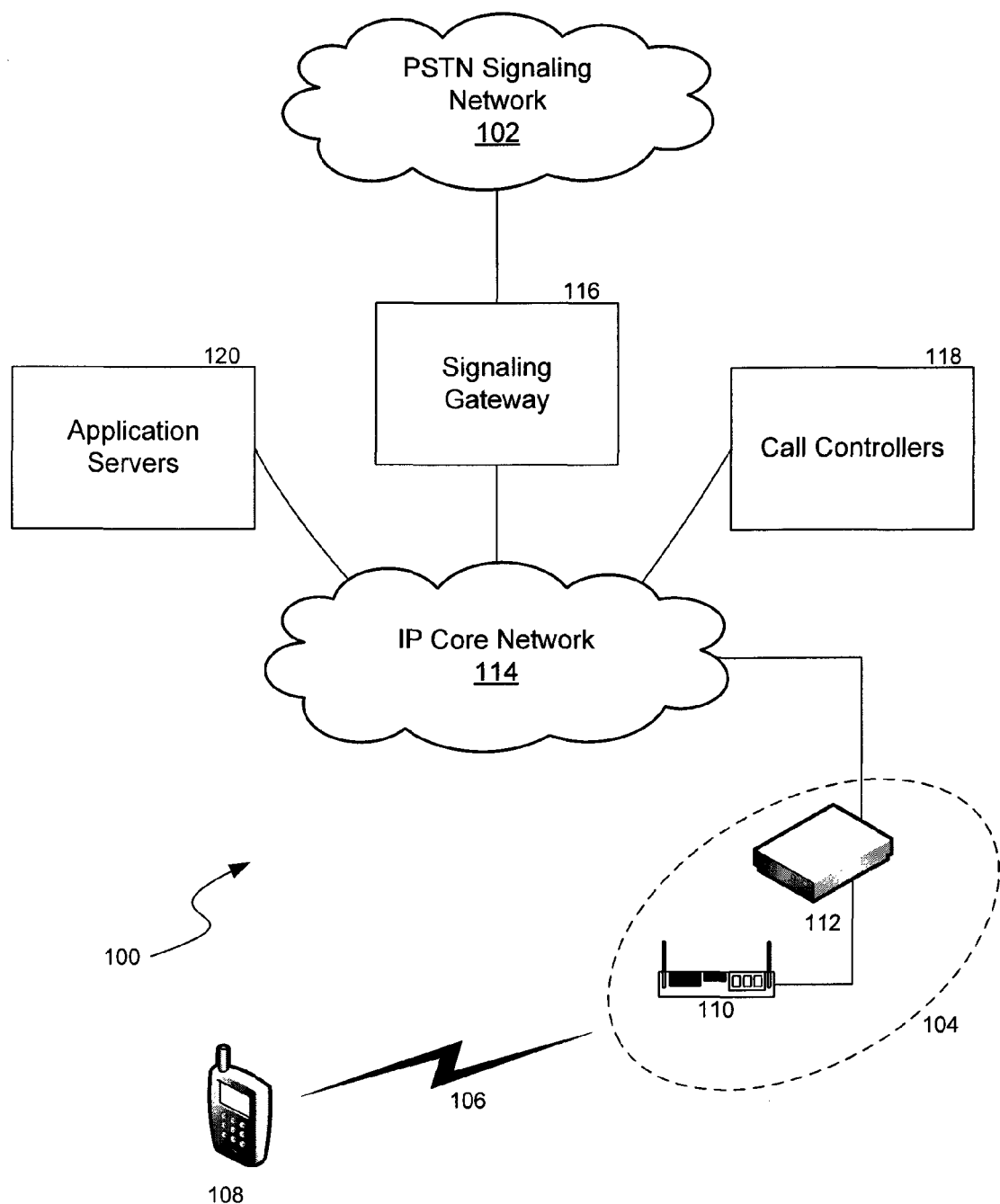
FIG. 1 illustrates aspects of a sample network system that allows VoIP-based communications in conjunction with a public switched telephone network (PSTN).

A system and method for providing subscription type access of a network to mobile devices seeking access via non-traditional entry points is described. In some examples, components within a network, such as a carrier's network, receive a registration message from a mobile device, determine a type of network the mobile device used to access the network, and, when the network type is an unlicensed network (e.g., IP or wireless network), initiate an authorization process to determine whether the mobile device is associated with a subscriber of the carrier's network.

For example, a mobile device may communicate with a wireless access point, such as a Wi-Fi router or femtocell, using one or more radios within the device. The access point forms part of a short-range wireless access network. The system, located in a subscription-type network or licensed spectrum provided by a carrier (such as a cellular or GSM network), receives a message for the device via a base station controller associated with the wireless access network. The system intercepts the message and reviews and/or parses the message to determine the type of network originating the message. Depending on the type of network (that is, how the device received access), the system may query a database to determine if the mobile device is associated with a subscriber of the carrier's network, and if so, authorize the mobile device on the carrier's network.

Thus, the system enables a telecommunication services provider, or carrier, to provide certain subscription type services to mobile devices connecting to their network using IP access networks (such as when not providing GSM codes/signals used to authorize these services), among other benefits. For example, the system may assist a carrier in promoting wireless access of the carrier's network by denying access via traditional entry points (such as via cellular base stations within licensed spectrums) while authorizing access via certain non-traditional entry points (such as unlicensed access points, including Wi-Fi routers or femtocells). In some cases, when a requesting mobile device includes both GSM and Wi-Fi radios, the system may identify and/or authorize access to the carrier's network using information from certain access points and using GSM codes (CGI or other information) while denying access via a GSM/CDMA connection at cell sites or other traditional entry points. In some cases, when a requesting mobile device does not contain a GSM radio, the system may first identify the type of network (or components within the network) used to access a carrier's network and initiate an authorization process based on the identification.

The following description provides specific details for a thorough understanding of, and enabling description for, various embodiments of the technology. One skilled in the art will understand that the technology may be practiced without these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Suitable System

Figure 2:
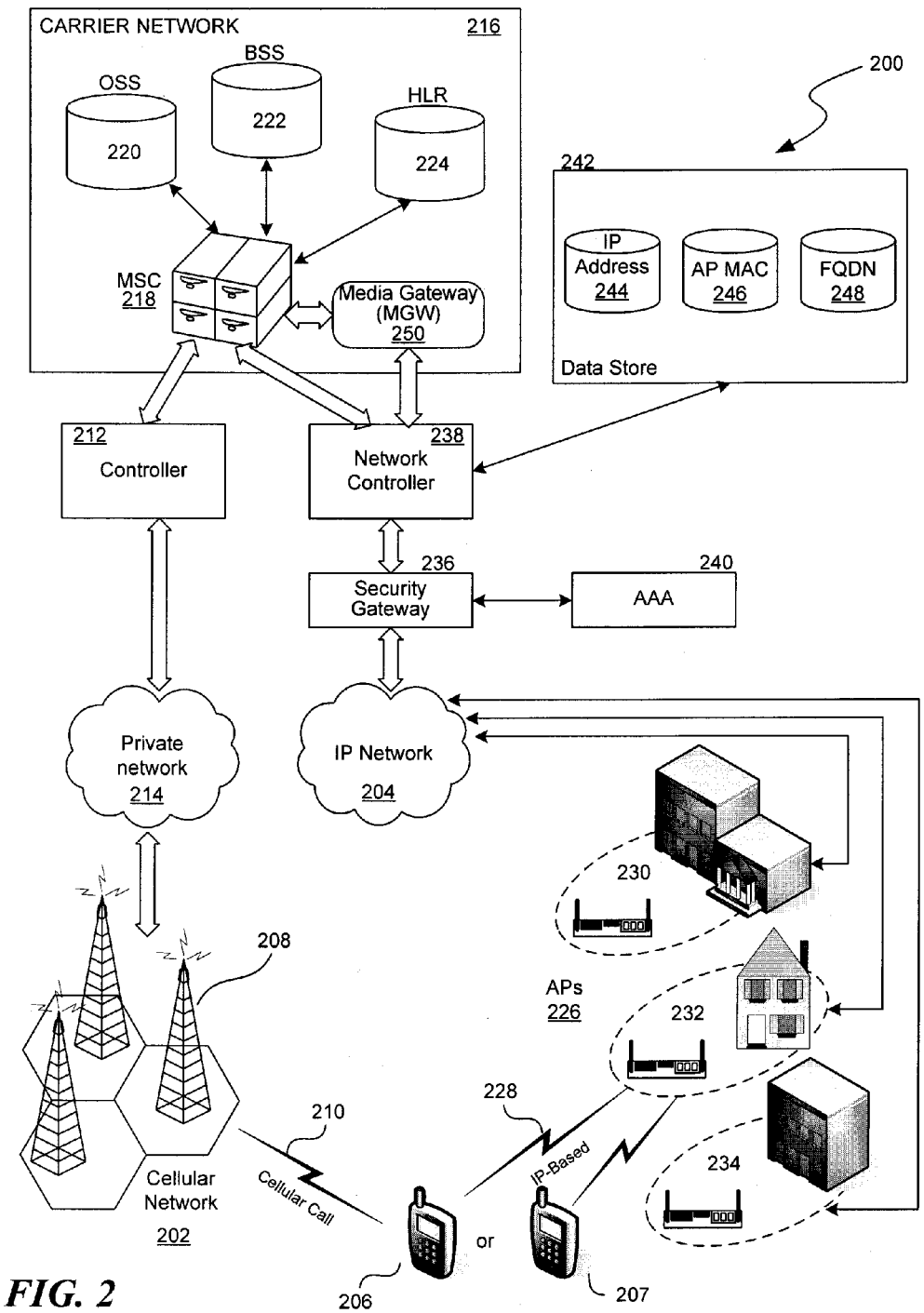
FIG. 2 illustrates an example converged wireless network system that combines a cellular network with an IP-based wireless telecommunications network.

FIGS. 1 and 2 show sample network system configurations in which aspects of mobile device authorization system may be implemented. In general, one purpose of the authorization system is to enable a carrier or service provider to implement subscription type services to mobile devices on a carrier's network.

FIGS. 1 and 2 and the following discussion provide a brief, general description of a suitable environment in which the system can be implemented. Although not required, aspects of the system are described in the general context of computer-executable instructions, such as routines executed by a general-purpose data processing device, e.g., a server computer, wireless device or personal computer. Those skilled in the relevant art will appreciate that aspects of the system can be practiced with other communications, data processing, or computer system configurations, including: Internet appliances, hand-held devices (including personal digital assistants (PDAs)), wearable computers, all manner of cellular or mobile phones, multi-processor systems, microprocessor-based or programmable consumer electronics, set-top boxes, network PCs, mini-computers, mainframe computers, and the like. Indeed, the terms "computer," "server," and the like are generally used interchangeably herein, and refer to any of the above devices and systems, as well as any data processor.

Aspects of the system can be embodied in a special purpose computer or data processor that is specifically programmed, configured, or constructed to perform one or more of the computer-executable instructions explained in detail herein. While aspects of the system, such as certain functions, are described as being performed exclusively on a single device, the system can also be practiced in distributed environments where functions or modules are shared among disparate processing devices, which are linked through a communications network, such as a Local Area Network (LAN), Wide Area Network (WAN), or the Internet. In a distributed computing environment, program modules may be located in both local and remote memory storage devices.

Aspects of the system may be stored or distributed on tangible computer-readable media, including magnetically or optically readable computer discs, hard-wired or preprogrammed chips (e.g., EEPROM semiconductor chips), nanotechnology memory, biological memory, or other data storage media. Alternatively, computer implemented instructions, data structures, screen displays, and other data under aspects of the system may be distributed over the Internet or over other networks (including wireless networks), on a propagated signal on a propagation medium (e.g., an electromagnetic wave(s), a sound wave, etc.) over a period of time, or they may be provided on any analog or digital network (packet switched, circuit switched, or other scheme).

FIG. 1 illustrates aspects of a sample network system 100 that allows VoIP-based communications in conjunction with a public switched telephone network (PSTN) 102. The system 100 includes at least one wireless access point 104. The access point 104 may be public or private, and may be located, for example, in a subscriber's residence (e.g., home, apartment or other residence), in a public location (e.g., coffee shops, retail stores, libraries, or schools) or in corporate or other private locations. In the sample system of FIG. 1, the access point 104 can accept communications 106 from at least one suitably configured telecommunications device 108 (e.g., a VoIP device). Various examples of network technology that may be involved in communicating between the telecommunications device 108 and the access point 104 include the IEEE 802.16 (WiMAX), IEEE 802.20 Mobile Broadband Wireless Access (MBWA), Ultra Wideband (UWB), 802.11 wireless fidelity (Wi-Fi), Bluetooth standards, or other similar standards. The access point 104 includes a wireless router 110 and a broadband modem 112 that enable connection to an Internet Protocol (IP) network 114. The IP network 114 may comprise one or more public networks, private networks, or combination of public and private networks.

In a communication or set of communications 106, the access point 104 receives IP packets from the telecommunications device 108. These IP packets are then transported through the IP network 114 to a signaling gateway 116, which in the example of FIG. 1, is operated by a telecommunications service provider. At the signaling gateway 116, the IP packets are converted to a traditional phone service signal. The phone service signal is then conveyed to a recipient via the PSTN 102.

The network system 100 of FIG. 1 also includes a call controller 118 that provides call logic and call control functions for communications sent through the system and an application server 120 that provides logic and execution of one or more applications or services offered by the telecommunications service provider, such as applications that implement various access and security rules. In some examples, aspects of the authorization system are implemented at the call controller 118 and/or application server 120, as described in more detail herein. In this example, a telecommunication service provider manages both the call controller 118 and the application server 120.

FIG. 2 illustrates a sample network system 200 in which aspects of the authorization system may be implemented within a cellular telephone-type network. In general, with respect to the network system described in FIG. 2, because the same cellular protocols are used in communications involving IP access points as with traditional radio towers, the cellular service provider maintains a large degree of system compatibility even though using an IP-based network. For example, the various systems of the cellular service provider that deliver content and handle mobility may not even need to be aware that a subscriber's mobile device is on an IP-based wireless telecommunications network. Instead, the various systems of the cellular service provider assume the mobile device is on its native cellular network. The IP network is, therefore, abstracted with respect to the cellular network, regardless of whether the mobile device connects to the cellular network via a base station (e.g., for licensed spectrum access) or a wireless access point (e.g., for licensed, semilicensed and/or unlicensed spectrum access-such as spectrums for UMA communications). Likewise, at a protocol level, because the same cellular protocols are used in communications involving the IP access points as with traditional radio towers, the cellular service provider maintains a large degree of system compatibility even though using an IP-based network.

Referring to FIG. 2, a sample network system 200 combines a cellular telephone network 202 (such as a GSM network) and an IP network 204 in a UMA-type configuration that provides service to the user of a converged mobile device 206 or UMA only mobile device 207. In some examples, the cellular network 202 is considered to be a traditional entry point to a telecommunications network, and the IP network is considered to be a non-traditional entry point to the telecommunications network. Such service may include voice services, and also supplementary services like call forwarding and call waiting, text messaging services like SMS, and data-based services like ring tone downloads, game downloads, picture messaging, email and web browsing. Further, since the mobile device 206 is connected to an IP network, all manner of data services available over such networks may be provided to the mobile device 206.

In general, the described network system 200 accepts registration requests and communication connections from the mobile device 206. The accepted registration requests can be requests to either the cellular telephone network 202 or to the IP-based network 204. Accordingly, to handle requests to the cellular telephone network 202, the cellular telephone network 202 includes one or more cell towers 208 that are configured to accept cellular communications 210 from the mobile device 206. The cell towers 208 are connected to a base station controller 212 (such as a base station controller/radio network controller (BSC/RNC)) via a private network 214. The private network 214 can include a variety of connections (not shown) such as T1 lines, a wide area network (WAN), a local area network (LAN), various network switches, and other similar components.

The base station controller 212 controls communication traffic to a carrier core network 216, where all communications are managed (including both cellular and IP-based). Components of the carrier core network 216 in this example include a mobile switching center (MSC) 218, which is configured to control data/call flows and perform load balancing, as well as other functions. The carrier core network 216 may also include a variety of system databases such as an operation support subsystem (OSS) database 220, a business support system (BSS) database 222, and home location register (HLR) 224 or other central subscriber database that contains details of a carrier's subscribers for billing, call logging, etc.

In some examples, a picocell may be communicatively coupled to a base station in the cellular network. The picocell is a wireless access point typically covering a relatively small area, such as within a building (e.g., office, shopping mall, train station, or the like) or within an aircraft, ship, train or other vehicle. A picocell may, for example, be analogous to a Wi-Fi access point, except that it typically broadcasts using the licensed spectrum of an associated wireless carrier. The picocell serves as an access point for routing communication between the device 206 and the network. One or more picocells may be coupled to the BSC by way of wired or wireless connections.

Alternatively or additionally, the IP-based network may include a VoIP broadcast architecture, UMA or GAN (Generic Access Network) broadcast architecture, or a femtocell broadcast architecture. Voice Over Internet Protocol, or VoIP, is a telecommunication system for the transmission of voice over the Internet or other packet-switched networks. Unlicensed Mobile Access or UMA, is the commercial name of the 3GPP Generic Access Network or GAN standard. Somewhat like VoIP, UMA/GAN is a telecommunication system which extends services, voice, data, and IP Multimedia Subsystem/Session Initiation Protocol (IMS/SIP) applications over IP-based networks. For example, a common application of UMA/GAN is in a dual-mode handset service in which device users can seamlessly roam and handover between local area networks and wide area networks using a GSM/Wi-Fi dual-mode mobile phone. UMA/GAN enables the convergence of mobile, fixed and Internet telephony, sometimes called Fixed Mobile Convergence. Femtocells are much like picocells—they broadcast within the licensed spectrum of a wireless telecommunications carrier. Femtocells are typically designed for use in residential or small business environments. Femtocells connects to the service provider's network much like UMA/GAN access points, namely over IP based networks.

These IP-based networks, which may operate over unlicensed spectrums, may include short-range communications networks, relying on short range wireless communications protocols such as Wi-Fi, Bluetooth, and so on. The ranges of these networks may vary from network to network, but are often less than 500 meters (e.g., less than 200 meters).

The sample network system 200 of FIG. 2 further includes one or more access points 226 that can accept IP-based communications 228 from the mobile device 206. For example, each access point 226 can be configured as part of a wireless network in one or more locations such as a public network 230, a home network 232, or a private business network 234. Each access point 226 is coupled to the IP network 204 through, for example, a broadband connection (not shown) such as a DSL (Digital Subscriber Line) modem, a cable modem, a satellite modem, or any other broadband device.

When the mobile device 206 attempts to access the IP network 204 (i.e., to initiate an IP-based communication), information (e.g., data, voice, SMS, etc.) is initially formatted in the cellular system's 202 native protocol and then encapsulated into Internet Protocol (IP) packets, which are transmitted to the access point 226 and routed through the IP network 204 to a security gateway 236. In contrast to non-IP communication requests, such transmissions bypass the cellular telephone system's 202 existing network of radio towers. The security gateway 236 controls access to a network controller 238, which communicates with a data store 242 for logging and accessing communications data. Thus, one function of the network controller 238 is to manage access to the carrier network 216 when dealing with an IP-based communication (in a similar manner to that performed by the base station controller 212 for a non-IP-based communication).

In one example, authentication of a request for access by the mobile device 206 over the IP network 204 is handled by the security gateway 236, which communicates with an authentication, access and authorization (AAA) module 240 that is most likely associated with the carrier network 216. Challenges and responses to requests for access by the mobile device 206 are communicated between the HLR 224 and the AAA module 240. When authorization is granted, the security gateway 236 communicates the assignment of an IP address to the mobile device 206 that requested access. Once the security gateway 236 passes the IP address to the mobile device 206, the public IP address assigned to the mobile device 206 is passed to the network controller 238.

In another authorization example, upon receiving an identifier from mobile device 206 or mobile device 207, the network controller 238 may query the data store 242 to determine if the mobile device 206 is authorized for accessing the IP network 204. Sample identifiers that may be utilized to determine access include a media access control (MAC) address associated with an access point, a mobile device or subscriber identifier (such as an International Mobile Subscriber Identifier (IMSI)), an Internet Protocol (IP) address (or "Public IP address") associated with the access point, a fully qualified domain name (FQDN), or other similar types of information. Sample mobile device identifiers may include a Mobile Identification Number (MIN), a Secret Security Number (SSN), and/or other information stored within memory of a mobile device, such as information or codes stored within a SIM of a mobile device. The data store 242 may be a single database, table, or list, or a combination of databases, tables, or lists, such as one for IP addresses 244, one of MAC addresses 246, and one for FQDNs 248. The data store 242 may include "blocked" identifiers as well as "authorized" identifiers. Authorized accesses to the IP-based wireless telecommunications network may be maintained by the network controller 238 in an authorized session table or similar data construct.

In some cases, the signaling portion of a communication (e.g., the portion of the communication that governs various overhead aspects of the communication such as, for example, when the call starts, when the call stops, initiating a telephone ring, etc.) is routed through the network controller 238 to the MSC 218, while the voice bearer portion of the communication (e.g., the portion of the communication that contains the actual content (either data or voice information) of the communication) is routed through the network controller 238 to a media gateway 250. In other words, the media gateway 250 controls the content flow between the service provider and the mobile device 206, while the MSC 218 controls the signaling flow (or controls overhead-related flow) between the service provider and the mobile device 216.

In some cases, the IP-based networks 204 (e.g., UMA networks) incorporate femtocell networks. Similar to VoIP, in femtocell networks voice communications are packetized and transmitted over the Internet. UMA networks typically feature Wi-Fi access points for receiving and sending voice communications over an unlicensed spectrum; femtocell networks typically feature wireless access points broadcasting within licensed spectrums of a telecommunications service provider, with conversion of voice communications into IP packets for transmission over the Internet.

Authorizing Mobile Devices to Telecommunications Networks

Figure 3:
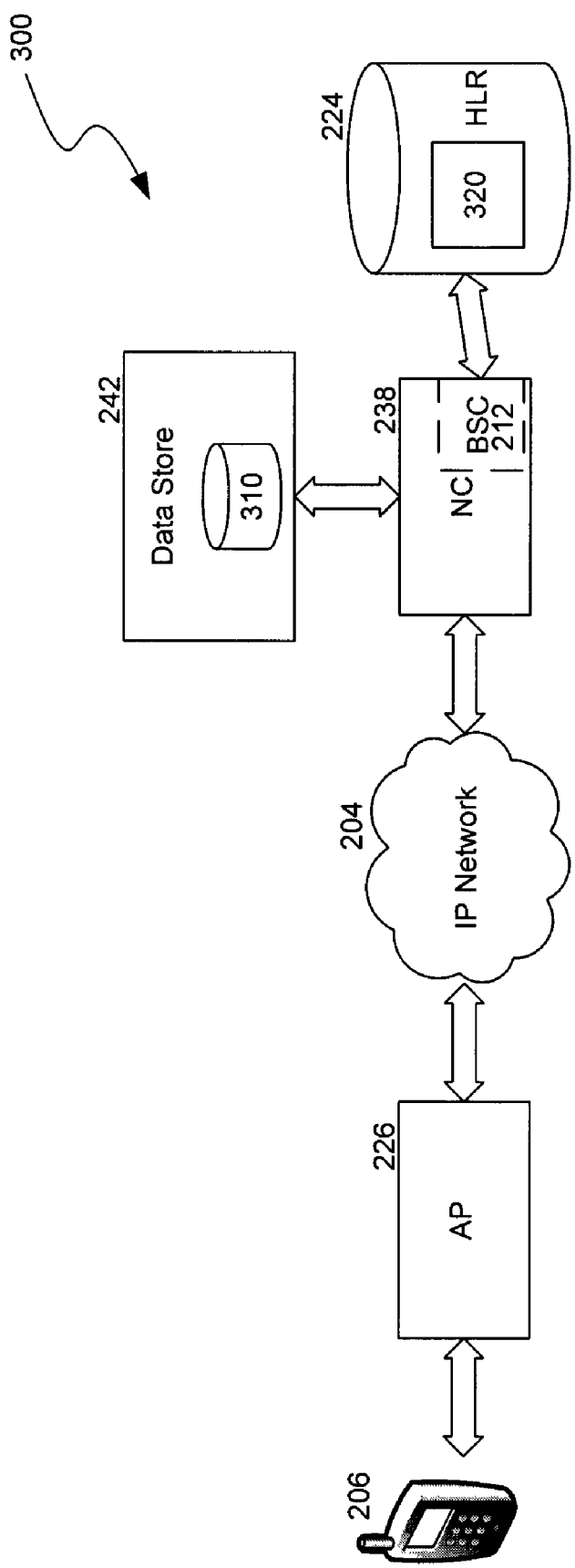
FIG. 3 illustrates a block diagram that includes components used to transmit, receive, and/or authorize mobile devices.

As described herein, in some examples the system includes components configured to authorize mobile devices on networks, regardless of the type of network used to access the network. The network may be various types of networks, including telecommunications networks, core networks, broadcast networks, cellular networks, licensed networks, unlicensed networks, and so on. Referring to FIG. 3, a block diagram 300 including components used to transmit, receive, and/or authorize mobile devices is shown.

An access point 226, such as a Wi-Fi router or femtocell, receives communications from a mobile device 206 or 207. The access point 226 may establish a communication session with the mobile device 206 or 207, as discussed herein with respect to FIG. 2. Via the access point 226, the mobile device 206 transmits information, via an IP network 204, to a network controller 238 (which may include a controller 212 or components configured to manage access to a carrier's network and act as a controller for signaling purposes) residing between the IP network 204 and components within a carrier's network, such as a data store 242 and/or a database (such as an HLR) 224. In addition to the functionalities discussed herein, these components of the carrier's network may also include components configured to authorize a mobile device to access services provided by a carrier's network, such as a database 310 that includes information for subscribers (and associated devices) of the network, and one or more software modules 320 stored within a memory (such as a computer-readable medium) of the HLR 224.

For example, the modules (or components) 320 may receive registration messages associated with mobile devices, parse the registration messages, identify a type of access network originating the registration messages, and/or transmit queries to the database 310 to check whether a mobile device is associated with a subscriber of the carrier's network. The modules 320 may also verify, validate, and/or authorize mobile devices to the carrier's network, or transmit information to other modules that indicates a mobile device is authorized. Of course, the system may locate the modules 320 outside of the HLR 224, such as in other components of the carrier's network, or as stand alone components. Further details regarding the functionality of the modules 320 are discussed herein.

Figure 4:
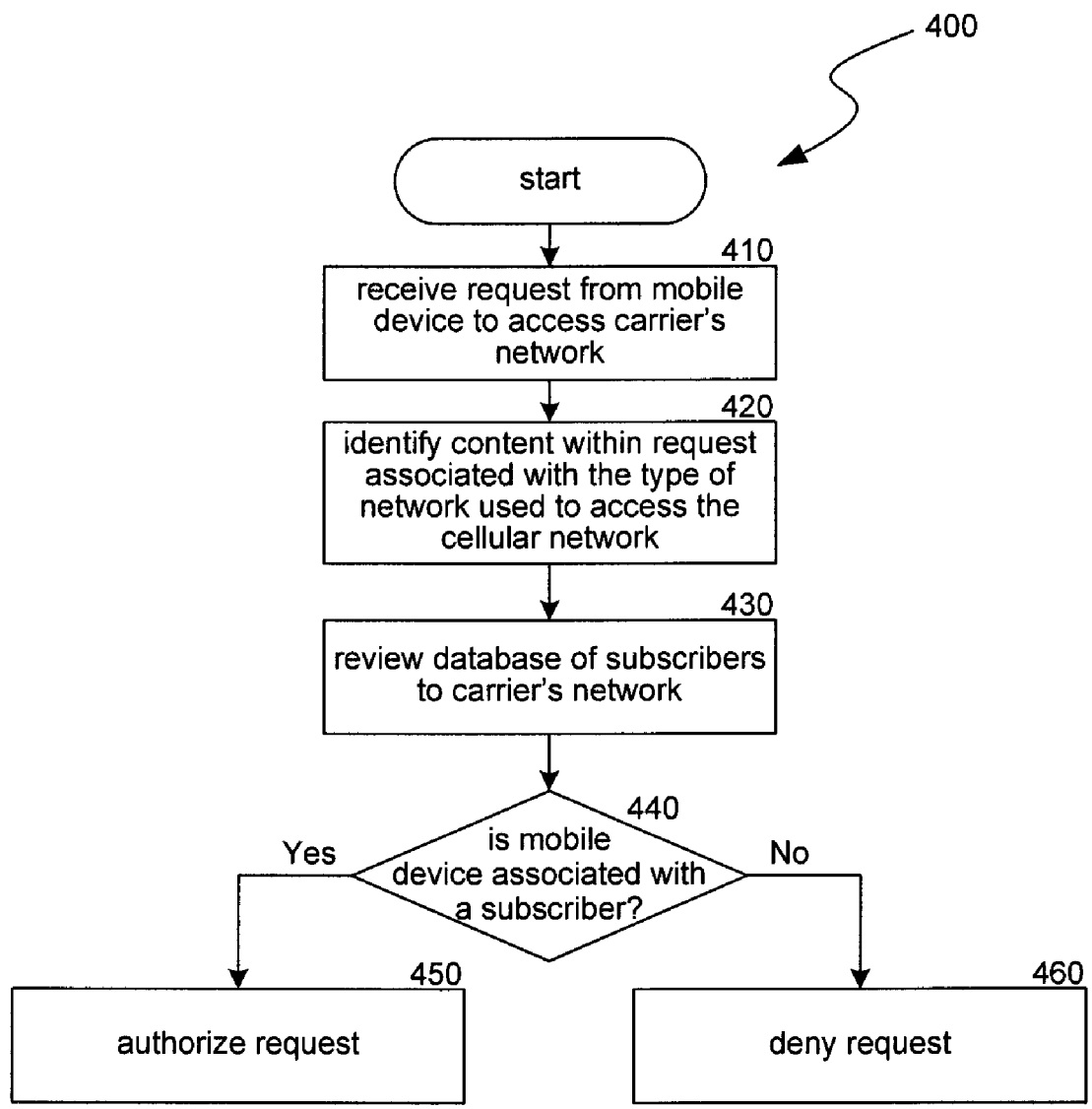
FIG. 4 is a flow diagram illustrating a routine for authorizing a mobile device on a carrier's network.

In some examples, the system uses information within registration messages to determine whether a mobile device is associated with a subscriber of certain services within a carrier's network, such as use of the network, voice communications over the network, data services, and so on. Referring to FIG. 4, a flow diagram illustrating a routine 400 for authorizing a mobile device to access services on or through a carrier's network is shown. In step 410, an authorization system receives a request from a mobile device to access a carrier's network. The system may receive such a request at a module 320 within an HLR 224, or at other modules within the network. The request may be in the form of a registration message sent to the carrier's network. The request may include information about the mobile device, the type of network used by the mobile device to access the carrier's network, the components within the access network, and so on.

In step 420, the system identifies content within the request associated with the type of network used to access the carrier's network. For example, the system may identify the access network used by the mobile device as being an IP-based network, such as a UMA network. Further details regarding the content within the request are discussed herein.

Once the system identifies the type of access network as an IP network, the routine 400 proceeds to step 430. Otherwise, routine 400 would end and authorization would proceed as is normal when devices access cellular networks using cellular base stations and other traditional entry points. In step 430, the system reviews a database of subscribers to the carrier's network. For example, the system may compare information about the mobile device to information stored in a database, such as database 310, of known subscribers. The information may include device identification information, such as the information discussed herein, or other information. The system may search or query the database to check for a match of the requesting mobile device and a subscribing mobile device.

In step 440, if the mobile device is associated with a subscriber of services provided by the carrier's network (that is, the query result returns a match), routine 400 proceeds to step 450, and the system authorizes the request to access the carrier's network, else routine proceeds to step 460, and denies the request to access the carrier's network.

Figure 5:
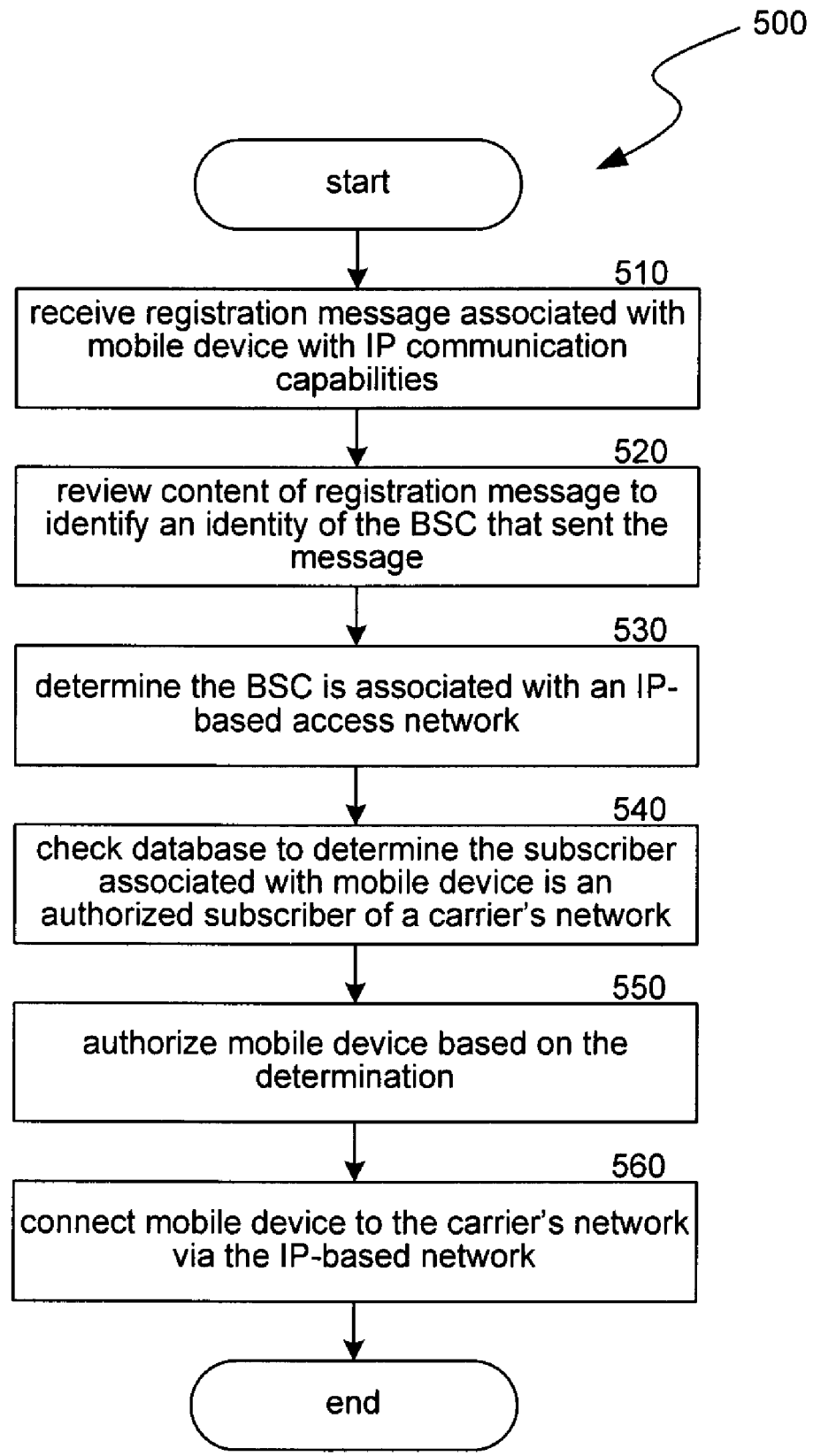
FIG. 5 is a flow diagram illustrating a routine in a home location registry of a carrier's network for authorizing access of the carrier's network from an originating IP network.

As discussed herein, the authorization system may review content within an access request to determine whether the request originates from a mobile device attempting to access a carrier's network via an IP network. Referring to FIG. 5, a flow diagram illustrating a routine 500 in a home location registry (or other module) of a carrier's network for authorizing access of the carrier's network from an originating IP network is shown.

In step 510, the system, via module 320, receives a registration message associated with a mobile device having IP communication capabilities. That is, a mobile device (such as a mobile device 207 that only includes IP communication components, a converged IP/GSM device 206, or a GSM only device) may initiate communications to a carrier's network via an IP access network, which may prompt a base station controller 238 to transmit a registration message to an HLR 224 in order to register the mobile device on the carrier's network.

In step 520, the system reviews the content of the registration message to identify an identity of the base station controller that sent the message. For example, a component 320 within the HLR 224 may first the receive the registration message, or intercept the message, and extract from the message content, information, and/or data associated with the identity of an originating base station controller. The extracted information may be a point signaling code that identifies the base station controller, or other similar information. For example, the point signaling code includes an originating signaling code, which may identify the base station controller that transmits the registration message to the HLR.

In step 530, the system determines the base station controller is associated with an IP access network. For example, the system may identify the base station controller as such via a table, list, or other suitable data structure stored within the module 320 that includes a list of IP base station controllers.

In step 540, the system checks a database of authorized subscribers to the carrier's network to determine whether the requesting mobile device is associated with an authorized subscriber. For example, the system may query a database of known subscribers, such as a database 310, as discussed herein, and matches information (such as a MAC address or other information described herein) about the mobile device to authorized mobile devices.

In step 550, the system authorizes the mobile device to the carrier's network. The system, in step 560, connects the mobile device to the carrier's network, via the IP-based access network, and provides services within the network.

Thus, the system is able to authorize the mobile device as being associated with a subscriber of the cellular network without receiving GSM information typically used to verify devices on the network (such as cgi information) over traditional entry points to the network (e.g., a base station). The system facilitates a carrier's network authorizing both GSM and non-GSM based mobile devices on the network, among other benefits.

Example Scenarios

Scenario #1: A user purchases a mobile device that only contains a Wi-Fi radio. Once at home, the user attempts to place a call via the user's home router. A carrier's network receives information identifying the user as well as information identifying the home router as being within a Wi-Fi network, and authorizes the user on the network.

Scenario #2: A user has a data only subscription plan for his smartphone, where the smartphone includes a Wi-Fi radio and a GSM radio. He enters a coffee shop that provides a Wi-Fi router authorized to access a carrier's network. The smartphone establishes a connection with the Wi-Fi router, and the carrier's network provides voice services over the Wi-Fi connection without requiring the user to subscribe to the additional services. However, the carrier's network does not provide voice services over cellular entry points.

Scenario #3: A user attempts to connect to a carrier's telecommunications network via a home femtocell access point. The system establishes a GSM connection between the user's mobile device (which only contains a GSM radio) and the femtocell. The carrier's network receives subscriber information (and CGI information) from the user's mobile device and femtocell, as well as information indicating that the user is accessing the carrier's network via the femtocell. The carrier's network authorizes the user for services based on the subscriber information and also authorizes additional services based on the information about the femtocell, but does not provide services via the cellular network.

Scenario #4: A user that prepays for services on a carrier's network attempts to access the network. The carrier receives GSM codes from the user during initial authorization, indicating the user is a prepaid subscriber, checks the billing database and determines that the customer's account is at or near its limit. The carrier also determines that the user's device has established a connection to the carrier's network via both a base station and a wireless access point. The carrier charges free or lower rates for wireless access at such access points and, therefore, authorizes the mobile device to receive services via the wireless access point.

Scenario #5: A post paid user who is late in paying a bill attempts to access a carrier's network via a base station. The carrier receives GSM codes from the user during initial authorization, identifies the user as being delinquent in paying her bill, and denies access to the network. However, when the user is proximate to a selected wireless access point and her mobile device establishes a connection to the access point, the carrier's network receives a request to connect to the network, and authorizes the request via the wireless access point.

CONCLUSION

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above Detailed Description of examples of the system is not intended to be exhaustive or to limit the system to the precise form disclosed above. While specific examples for the system are described above for illustrative purposes, various equivalent modifications are possible within the scope of the system, as those skilled in the relevant art will recognize. For example, while aspects of the system are described above with respect to capturing and routing digital images, any other digital content may likewise be managed or handled by the system provided herein, including video files, audio files, and so forth. While processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel, or may be performed at different times.

The teachings of the system provided herein can be applied to other systems, not necessarily the system described above. The elements and acts of the various examples described above can be combined to provide further implementations of the system.

Other changes can be made to the system in light of the above Detailed Description. While the above description describes certain examples of the system, and describes the best mode contemplated, no matter how detailed the above appears in text, the system can be practiced in many ways. Details of the system may vary considerably in its specific implementation, while still being encompassed by the system disclosed herein. As noted above, particular terminology used when describing certain features or aspects of the system should not be taken to imply that the terminology is being redefined herein to be restricted to any specific characteristics, features, or aspects of the system with which that terminology is associated. In general, the terms used in the following claims should not be construed to limit the system to the specific examples disclosed in the specification, unless the above Detailed Description section explicitly defines such terms. Accordingly, the actual scope of the system encompasses not only the disclosed examples, but also all equivalent ways of practicing or implementing the system under the claims.

While certain aspects of the system are presented below in certain claim forms, the applicant contemplates the various aspects of the system in any number of claim forms. For example, while only one aspect of the system is recited as a means-plus-function claim under 35 U.S.C sec. 112, sixth paragraph, other aspects may likewise be embodied as a means-plus-function claim, or in other forms, such as being embodied in a computer-readable medium. (Any claims intended to be treated under 35 U.S.C. §112, ¶6 will begin with the words "means for", but use of the term "for" in any other context is not intended to invoke treatment under 35 U.S.C. §112, ¶6.) Accordingly, the applicant reserves the right to add additional claims after filing the application to pursue such additional claim forms for other aspects of the system.

We claim:

1. In a wireless telecommunications system communicating with multiple mobile devices, wherein the wireless telecommunications system includes a converged telecommunications network that employs a core telecommunications network, a cellular broadcast network and an IP-based broadcast network, and wherein subscribers can access the IP-based broadcast network via wireless connections between mobile devices and wireless access points forming IP-based wireless local area networks (WLANs), a method performed by the core telecommunications network to authorize access of a mobile device to services of the core telecommunications network, the method comprising:

receiving a registration message from the mobile device at a network controlling node that facilitates communication between the core telecommunications network and the IP-based broadcast network, wherein the registration message includes information indicating that the mobile device is communicating with the IP-based broadcast network;

determining from content included in the received registration message that the mobile device is capable of communicating with the core telecommunications network via the IP-based access network; and upon determining that the mobile device is capable of communicating with the core telecommunications network via the IP-based broadcast network:

searching for information in a database of mobile devices authorized to communicate over the core telecommunications network, wherein searching for information includes searching for information that indicates that the mobile device is associated with a subscriber of services provided via the IP-based broadcast network but not services provided via the cellular broadcast network;

determining, based on the indication, that the mobile device is associated with a subscriber of services provided via the IP-based broadcast network, but not a subscriber to services provided via the cellular broadcast network; and permitting the mobile device to only receive services via the IP-based broadcast network, but not to receive services via the cellular broadcast network.

2. The method of claim 1, wherein the content included in the received registration message indicates that the mobile device is only authorized to access the core telecommunications network via the IP-based access network.

3. The method of claim 1, wherein the content included in the registration messages includes signaling point code for a base station controller within the network controlling node and in communication with a home location registry within the core telecommunications network.

4. The method of claim 1, wherein the registration message is received from the network controlling node at a home location registry within the core telecommunications network.

5. The method of claim 1, wherein a component within a home location registry within the core telecommunications network receives the registration message from the network controlling node and searches the database of mobile devices authorized to communicate over the core telecommunications network for the mobile device.

6. A system of tangible components located within a home location registry of a telecommunications network that permits multiple mobile devices to access at least some services offered by or through the telecommunications network, the system comprising:

an entry point identification component in communication with an access network, wherein the access network is in communication with the telecommunications network and the mobile devices, wherein the mobile devices seek access to services of or through the telecommunications network, and wherein the entry point identification component includes:

a message reception component, wherein the message reception component is configured to receive registration messages from mobile devices seeking access to the telecommunications network;

a message monitoring component in communication with the message reception component, wherein the message monitoring component is configured to identify base station controllers within the access network transmitting the registration messages to the telecommunications network; and a network determination component, wherein the network determination component is configured to determine types of networks used by the mobile devices to access services of or through the telecommunications network based on the identified base station controllers;

an authorization component in communication with the network determination component, wherein the authorization component is configured to check a database of authorized subscribers to the telecommunications network associated with the mobile devices when the network determination component determines the type of network used by a mobile device to access the telecommunications network is an IP-based network, wherein the mobile device accesses the IP-based network via unlicensed spectrum; and an access component, wherein the access component is configured to establish connections between the mobile devices associated with authorized subscribers to the telecommunications network and the telecommunications network.

7. The system of claim 6, wherein the access component is further configured to prevent connections between the mobile devices associated with unauthorized subscribers to the telecommunications network and the telecommunications network, wherein the telecommunications network is a GSM or CDMA network.

8. The system of claim 6, wherein the network determination component is configured to determine the types of networks used by the mobile devices to access the telecommunications network based on identifying signaling point codes from the base station controllers within the received registration messages.

9. The system of claim 6, wherein checking the database of authorized subscribers to the telecommunications network includes accessing a database located outside of the home location registry that includes information used to authorize mobile devices to IP-based access networks.

10. The system of claim 6, wherein checking the database of authorized subscribers to the telecommunications network includes accessing a database located within the home location registry that includes information that relates authorized mobile devices to network types associated with the authorized mobile devices.

11. The system of claim 6, wherein the message monitoring component is configured to intercept the received registration messages and transmit the identified identities of the base station controllers to the network determination component.

12. A method for authorizing access of a telecommunications network by a mobile device, the method comprising:

receiving, at a core telecommunications network, a registration message from a base station controller component in communication with an IP access network, wherein the IP access network is in communication with the mobile device, and wherein the mobile device seeks access to services of the core telecommunications network via the IP access network;

determining that the registration message includes content indicating the base station controller forms part of the IP access network;

checking a database of mobile devices authorized to receive services from the core telecommunications network for information associated with the mobile device seeking access to services of the core telecommunications network; and permitting access to services of the core telecommunications network only via the IP access network when the database of authorized mobile devices includes information that the mobile device seeking access to services of the telecommunications network may only access services of the core telecommunications network via the IP access network.

13. The method of claim 12, wherein the content includes a point signaling code from the base station controller.

14. A method for denying a mobile device access to a core telecommunications network, the method comprising:

receiving, at a home location registry within the core telecommunications network, a registration message from a network controller or base station controller in communication with a mobile device within an IP access network, wherein the mobile device seeks access to services of the core telecommunications network via the IP access network, and wherein the mobile device accesses the IP-based network via unlicensed spectrum;

determining that the registration message includes content indicating the network controller or base station controller is within the IP access network;

checking a database of mobile devices authorized on the core telecommunications network for information associated with the mobile device seeking access to the core telecommunications network; and denying access to services of the core telecommunications network when the check of the database of authorized mobile devices does not identify information associated with the mobile device seeking access to the telecommunications network.

15. The method of claim 14, wherein the content includes a point signaling code from the base station controller.

16. A tangible computer-readable medium, wherein the medium is not a signal, for use within a telecommunications network, wherein contents of the computer-readable medium, when executed, cause an authorization system to perform a method for authorizing mobile devices to access services from the network, the method comprising:

intercepting a request from a mobile device to access services from the telecommunications network;

determining a point of entry to the telecommunications network by the mobile device, wherein the telecommunications network has a set of entry points, and wherein a proper subset of entry points include at least one wireless access point; and when the determined point of entry includes the at least one wireless access point, then authorizing the mobile device access to services of the telecommunications network via the predetermined access point, but denying access to services of the telecommunications network via other points of entry, wherein the mobile device communicates with the access point via unlicensed spectrum.

17. The computer-readable medium of claim 16, wherein determining a point of entry to the telecommunications network includes:
- identifying information associated with the mobile device that indicates the mobile device is capable of accessing the telecommunications network via a licensed wireless point of entry; and
- identifying information associated with the intercepted request that indicates the request originates from a network controller in communication with an unlicensed wireless access point.

18. The computer-readable medium of claim 16, wherein the at least one wireless access point is a Wi-Fi access point.

19. The computer-readable medium of claim 16, further comprising receiving information identifying an unlicensed access point to the telecommunications network and authorizing access based at least in part on the received information.

20. In a wireless telecommunications system communicating with multiple mobile devices, wherein the wireless telecommunications system includes a converged telecommunications network that employs both a cellular network and an IP-based network, and wherein mobile device users can access the IP-based network via wireless connections between mobile devices and wireless access points that forms IP-based wireless local area networks (WLANs), a method performed by the wireless telecommunications system to provide access to the converged telecommunications network, the method comprising:
- receiving within the converged telecommunications network a registration message associated with a mobile device capable of communicating over both the cellular network and the IP-based network, wherein the registration message includes identification information that identifies the mobile device to the converged telecommunications network;
- denying access to services provided by the cellular network of the converged telecommunications network based on the included identification information; but
- permitting access to services provided by the IP-based network of the converged telecommunications network based on the included identification information.

21. The method of claim 20, wherein permitting access to services of the converged telecommunications network includes authorizing a wireless access point within the IP-based network to establish a connection between the mobile device and the converged telecommunications network based on information associated with the wireless access point.

22. The method of claim 20, wherein the cellular network includes a femtocell and the converged telecommunications network only permits GSM communications between the mobile device and the converged telecommunications network via the femtocell.

23. The method of claim 20, wherein the IP-based network includes a Wi-Fi router and the converged telecommunications network only permits communications between the mobile device and the converged telecommunications network via the Wi-Fi router.

24. The method of claim 20, wherein the converged telecommunications network permits access to a first service via the IP-based network and permits access to a second service via the cellular network.

25. A system for authorizing access of a telecommunications network by a mobile device, the method comprising:
- means for receiving, at a core telecommunications network, a registration message from a base station controller in communication with a mobile device within an IP access network, wherein the mobile device seeks access to the core telecommunications network via the IP access network;
- means for determining that the registration message includes content indicating the base station controller is within the IP access network;
- means for checking a database of mobile devices authorized on the core telecommunications network for information associated with the mobile device seeking access to the core telecommunications network; and
- means for permitting access to the core telecommunications network only via the IP access network when the database of authorized mobile devices includes information associated with the mobile device seeking access to the telecommunications network.

* * * * *